Dec. 7, 1937.  A. L. HAUGEN  2,101,739
LAWN MOWER
Filed June 21, 1937   2 Sheets-Sheet 1
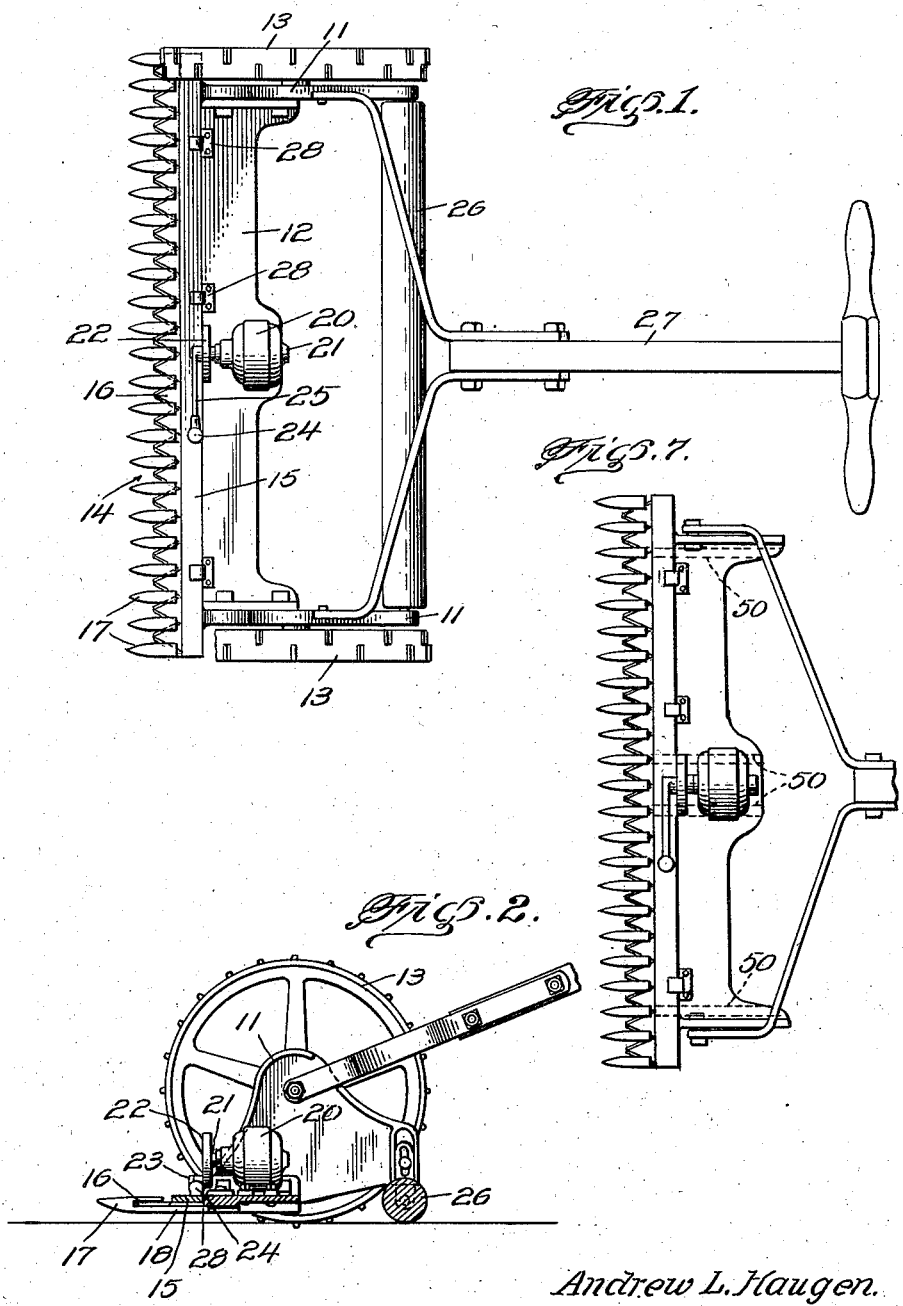
Andrew L. Haugen.
INVENTOR
BY Victor J. Evans & Co.
ATTORNEYS

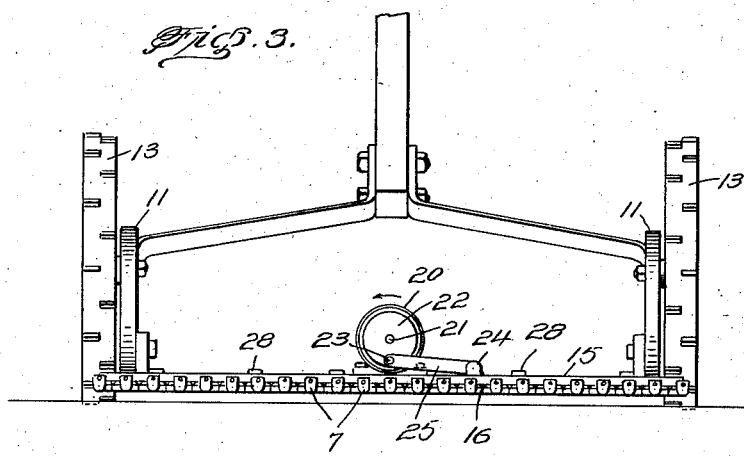
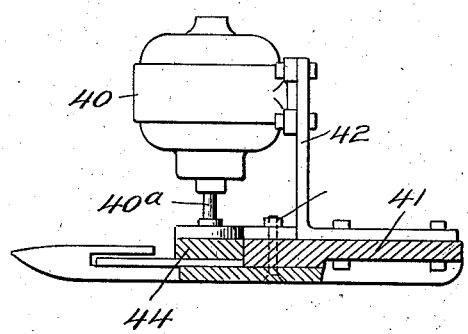
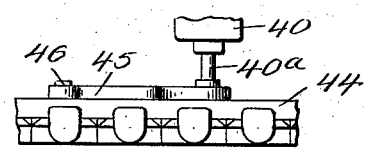
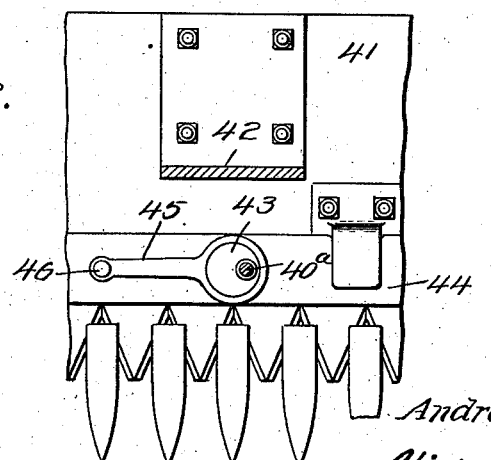

Patented Dec. 7, 1937

2,101,739

UNITED STATES PATENT OFFICE 2,101,739

LAWN MOWER

Andrew L. Haugen, New York, N. Y.

Application June 21, 1937, Serial No. 149,490

2 Claims. (Cl. 56—25)

My invention relates to lawn mowers and particularly to those in which the cutting mechanism is operated by electric power or the like.

One of the principal objects of my invention is to provide means for operating the cutting mechanism of lawn mowers which is efficient in use and simple in construction.

Another object of my invention is to provide means whereby the cutting mechanism may be adjusted to a desired heighth in relation to the ground.

A further object of my invention is to provide means whereby the cutting mechanism is so arranged as to lend itself to easy operation.

Other objects and advantages will be apparent from the following description, appended claims, and annexed drawings.

Referring to the drawings wherein like reference characters designate like parts throughout the several views:

Fig. 1 is a top plan view of my invention.

Fig. 2 is a sectional view taken on a line 2—2 of Fig. 1.

Fig. 3 is a front elevation thereof.

Fig. 4 is a detail sectional view illustrating a modified form of the motor mounting.

Fig. 5 is a top plan view of the connecting means illustrated in Fig. 4.

Fig. 6 is a front elevation of the connection shown in Figures 4 and 5.

Fig. 7 is a top plan view of another modified form.

In practicing my invention, I utilize a frame comprising a pair of oppositely disposed housings 11 connected together by a transverse extending frame member 12. Disk wheels 13 are rotatably secured to said housings and serve to pivot and support the frame above the ground as well as assisting in the mowing operation.

A mowing mechanism 14, comprising a reciprocating sickle bar 15 having parallel teeth 16 projecting from the front edge thereof is adapted to be reciprocated in close contact with a series of like teeth 17 carried by the front edge of a guard bar 18, is bolted to the horizontal frame member 12 so that as the sickle bar is reciprocated during the forward movement of the mower, the grass or weeds being caught between the teeth of said cutter and said guard bar and cut a desired length from the ground.

Upon the frame member 12 there is mounted an electric motor 20 having a shaft 21 extending in a horizontal plane relative to the upper face of the frame member 12. Upon the shaft 21 there is mounted, for rotation therewith, an eccentric means comprising a disk 22 having a pin 23, as illustrated in Fig. 3 of the drawings, pivotally connected to a bifurcated member 24, secured on the sickle bar, by means of a connecting link 25.

It will be apparent that rotation of the motor shaft, through the medium of the disk 22, pin 23, link 25 and member 24, will impart reciprocating movement to the sickle bar to actuate the same during the mowing operation.

Secured between the housings and connected thereto is an adjustable roller 26 which when adjusted vertically in relation to the ground serves to rock the cutter mechanism in either elevated or lowered position relative to the ground to cut the grass or weeds a desired length. A suitable handle 26 is provided for manually moving the mower.

Guide members 28, secured to the frame member 12, serve to align and maintain the sickle bar in proper position in relation to the guard bar.

It will be noted, and with reference to Fig. 1 of the drawings, that the guard and sickle bar are disposed in front of the disks 13, thus permitting a greater cutting area to be obtained than in mowers where the same is disposed between the disks or housings.

A slightly modified form of mounting the motor is shown in Figures 4, 5 and 6 of the drawings, wherein the motor 40 is secured to the frame member 41 by means of a suitable bracket 42. The shaft 40a of the motor is mounted perpendicular to the plane of the frame member 41 and has secured on the lower end thereof an eccentric disk 43 connected to the reciprocating sickle bar 44 by means of a connecting arm 45 secured to a pin 46 carried by said sickle bar. Obviously, rotation of the shaft 40a will impart a reciprocating movement to the sickle bar through the medium of the eccentric disk 43, link 46 and pin 47, as clearly illustrated in Fig. 6.

Should it be the desideratum, the wheels 13, housing 11 and roller 26 may be eliminated and the device operated over the ground on runners 50, illustrated in Fig. 7.

From the foregoing, it will be apparent that many changes in construction and modifications may be resorted to without departing from the spirit of the invention or scope of the appended claims.

Having described my invention, what I claim is:

1. In a lawn mower, a frame having a transverse extending frame member, means secured thereto and adapted to support said frame above the ground, a guard bar secured to said member, a sickle bar mounted on said guard bar and coacting therewith, a motor mounted on said member and equipped with an eccentric, and a ring secured on said sickle bar in which said eccentric is adapted to revolve to actuate said sickle bar.

2. In a lawn mower, a frame having a transverse extending frame member, means secured thereto and adapted to support said frame above the ground, a guard bar secured to said member, a sickle bar mounted on said guard bar and coacting therewith, a motor mounted above said sickle bar and having a perpendicular extending shaft equipped with an eccentric, and a ring pivotally connected to said sickle bar in which said eccentric is adapted to revolve to reciprocate said sickle bar.

ANDREW L. HAUGEN.